G. W. ROYALTY.
CISTERN FILTER.
APPLICATION FILED AUG. 3, 1915.
1,208,021. Patented Dec. 12, 1916.
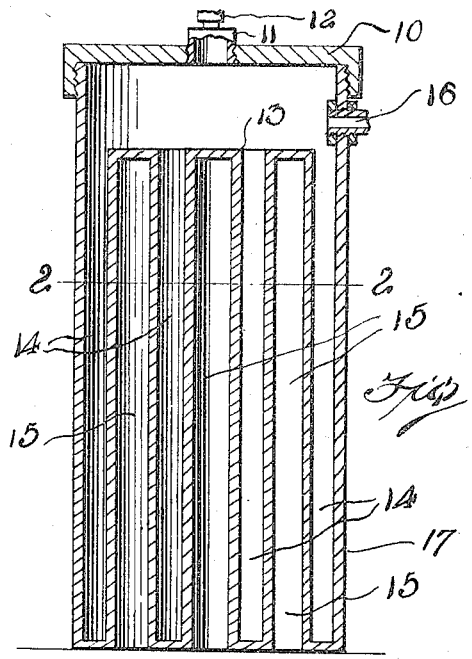
*Fig. 1.*
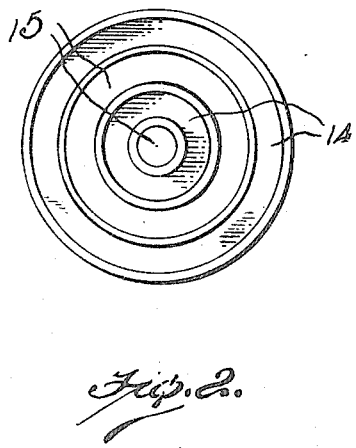
*Fig. 2.*
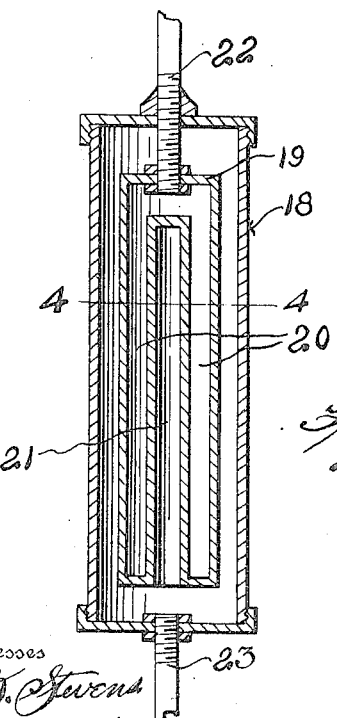
*Fig. 3.*
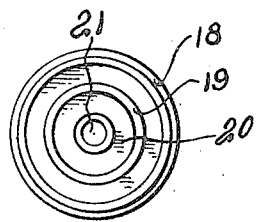
*Fig. 4.*
Witnesses
R. K. Stevens
H. M. Test
Inventor
G. W. Royalty.
By 
Attorney

UNITED STATES PATENT OFFICE.

GEORGE W. ROYALTY, OF GREENE, IOWA.

CISTERN-FILTER.

1,208,021.　　　　Specification of Letters Patent.　　Patented Dec. 12, 1916.

Application filed August 3, 1915. Serial No. 43,431.

*To all whom it may concern:*

Be it known that I, GEORGE W. ROYALTY, a citizen of the United States, residing at Greene, in the county of Butler, State of Iowa, have invented certain new and useful Improvements in Cistern-Filters; and I do hereby declare the following to be a full, clear, and exact description of the invention, such as will enable others skilled in the art to which it appertains to make and use the same.

This invention relates to improvements in filters and particularly to cistern filters for rain water.

One object of the invention is to provide a simple filter which can be readily attached to a rain spout which leads to a cistern whereby all sediment and leaves can be separated from the water and the water delivered to the cistern in a clean pure state.

Another object is to provide a filtering device which can be applied to the ordinary service pipe between the main and the faucet where there is a pressure system used.

Other objects and advantages will be apparent from the following description when taken in connection with the accompanying drawing.

In the drawing: Figure 1 is a vertical section of a filter used in connection with a cistern, Fig. 2 is a transverse section on the line 2—2 of Fig. 1, Fig. 3 is a vertical section of a filter used in pressure systems, and Fig. 4 is a transverse section on the line 4—4 of Fig. 3.

Referring particularly to the accompanying drawing, and particularly to Figs. 1 and 2, 10 represents a suitable metal cap, in the center of which is mounted a nipple 11 for connection of the rain spout 12. Detachably secured to this cap is the upper end of a filtering stone 13, the same being hollow at the points 14 to form longitudinal and circular pockets extending into the stone from the upper end, and pockets 15 extending inwardly from the lower end and concentrically between the other pockets. In one side of the upper end of the casing is an overflow pipe 16.

The rain water is discharged into the upper end of the casing and passes down into the pockets 14 from which it filters through the walls of the pockets into the pockets 15, from whence it is discharged through the bottom of the casing 17. Should the water flow into the casing faster than the stone filter will permit the water to pass therethrough, the excess of water will flow out through the pipe 16.

Referring to Figs. 3 and 4 there is shown a casing 18 in which is placed a stone filter 19 having the longitudinal outer pockets 20 which are closed at both ends, and the intermediate pocket 21, closed at the upper end but open at the lower end. Extending through the top of the casing is a pipe 22 connected at its lower end into the upper end of the stone 19 so as to discharge water into the pockets 20. The lower end of the casing has an outlet pipe 23.

The water passes into the stone 19 from the pipe 22, and filters through the walls of the pockets into the pocket 21 and into the space surrounding the stone, within the casing. The water, thus filtered through the stone passes out through the pipe 23 to the faucet, not shown. It will be noted that the tops and bottoms of both of the casings 10 and 18 are removable so that the stone can be taken out to be cleaned or repaired.

What is claimed is:

1. As an article of manufacture, a filtering element consisting of a cylinder stone having a series of concentric pockets formed therein and opening alternately at opposite ends of the cylinder, the central pocket being circular in cross section and the remaining pockets being annular in cross section.

2. A filter comprising an integral stone filtering element having a series of concentric pockets formed therein, said pockets opening alternately at opposite ends of the filtering element, the central pocket being circular in cross section and the remaining pockets being annular in cross section, and means to provide material to be filtered to one end of the element and to permit the withdrawal of filtered material from the remaining end of the element.

In testimony whereof, I affix my signature, in the presence of two witnesses.

GEORGE W. ROYALTY.

Witnesses:
　I. V. HODGIN,
　W. H. BUCHHOLZ.

Copies of this patent may be obtained for five cents each, by addressing the "Commissioner of Patents, Washington, D. C."